(12) United States Patent
Lin et al.

(10) Patent No.: US 7,768,806 B2
(45) Date of Patent: Aug. 3, 2010

(54) MIXED-CODE DC/AC INVERTER

(75) Inventors: Yung-Lin Lin, Palo Alto, CA (US); Da Liu, Milpitas, CA (US)

(73) Assignee: O2Micro International Limited, Grand Cayman (KY)

( * ) Notice: Subject to any disclaimer, the term of this patent is extended or adjusted under 35 U.S.C. 154(b) by 762 days.

(21) Appl. No.: 11/637,421

(22) Filed: Dec. 11, 2006

(65) Prior Publication Data

US 2008/0137384 A1 Jun. 12, 2008

(51) Int. Cl.
*H02M 7/525* (2006.01)

(52) U.S. Cl. ............................. 363/97; 363/95; 363/291; 363/307; 363/224

(58) Field of Classification Search ............... 315/291, 315/224, 219, 307, 209 R, DIG. 4, DIG. 7; 363/97, 98, 131, 13; 345/102
See application file for complete search history.

(56) References Cited

U.S. PATENT DOCUMENTS

| | | | |
|---|---|---|---|
| 3,736,516 A | 5/1973 | Ellis | 328/134 |
| 5,384,516 A | 1/1995 | Kawabata et al. | |
| 5,396,155 A | 3/1995 | Bezdon et al. | 315/291 |
| 5,619,402 A | 4/1997 | Liu | |
| 5,742,134 A | 4/1998 | Wacyk et al. | |
| 5,818,669 A | 10/1998 | Mader | |
| 5,923,129 A | 7/1999 | Henry | |
| 5,930,121 A | 7/1999 | Henry | |
| 5,965,989 A | 10/1999 | Mader | |
| 5,998,937 A | 12/1999 | Nishigaki | 315/209 PZ |
| 6,008,590 A | 12/1999 | Giannopoulos et al. | |
| 6,198,236 B1 | 3/2001 | O'Neill | |
| 6,212,079 B1 | 4/2001 | Balakrishnan et al. | 363/21 |
| 6,313,976 B1 | 11/2001 | Balakrishnan et al. | |
| RE37,609 E * | 3/2002 | Bittner | 323/272 |
| 6,452,344 B1 * | 9/2002 | MacAdam et al. | 315/307 |
| 6,469,454 B1 | 10/2002 | Mader et al. | |
| 6,567,866 B1 | 5/2003 | Poisner | |
| 7,173,404 B2 | 2/2007 | Wu | 323/282 |
| 7,242,153 B2 * | 7/2007 | Yu et al. | 315/291 |
| 2006/0158136 A1 | 7/2006 | Chen | 315/308 |
| 2008/0136343 A1* | 6/2008 | Yu et al. | 315/219 |

FOREIGN PATENT DOCUMENTS

FR 2610149 7/1988

(Continued)

OTHER PUBLICATIONS

Office Action received in Korean Application No. 2007-0026926 dated Nov. 4, 2008 (8 pages).

(Continued)

*Primary Examiner*—Douglas W Owens
*Assistant Examiner*—Ephrem Alemu

(57) ABSTRACT

A DC/AC inverter and method thereof are disclosed. The DC/AC inverter for driving a load includes a DC power supply for supplying a DC input voltage, a converter circuit coupled to the DC power supply which converts the DC input voltage into an AC signal used to drive the load, and a control circuit coupled to the converter circuit which sets a frequency of the AC signal. The control circuit is further capable of operating the DC/AC inverter in a fixed frequency mode and in a variable frequency mode in accordance with the DC input voltage and the load condition.

21 Claims, 5 Drawing Sheets

FOREIGN PATENT DOCUMENTS

| | | |
|---|---|---|
| JP | 10228993 | 8/1998 |
| JP | 2002-503876 | 2/2002 |
| WO | WO 96/33595 | 10/1996 |
| WO | WO99/41953 | 8/1999 |
| WO | WO 99/41953 | 8/1999 |
| WO | WO 00/59105 | 10/2000 |

OTHER PUBLICATIONS

English Summary of Office Action of Korean Patent Application 2007-0026926 dated Nov. 18, 2008 (4 pages).
Design and Analysis of Automotive High Intensity Discharge Lamp Seoul http://library.snu.ac.kr/DetailView.jsp?uid=11&cid=923907, National University Doctor's thesis, Dec. 2000 (17 Pages).
UC3842/3/4/5 Provides Low-Cost Current-Mode Control, Texas Instruments Incorporated's Unitrode Application Note U-100A, (15 Pages).
Design of 30watt Inverter for High Luminance LCD Backlight Application, Institute of Electronics Engineers of Korea's paper, 1999 (4 Pages).
Case No. SACV 04-1174 CJC (ANx) Microsemi Corporation Plaintiff v. Monolithis Power Systems, Inc., Defendant Declaration of Charles Coles, Filed by Defendant/Counterclaimant Monolithic Power Systems, Inc. in Support of its Motion for Summary Judgement of Invalidity of Asserted Claims of U.S. Patent No. 6,198,234- 60pgs.
Society for Infomration Display, International Symposium, Digest of Technical Papers vol. XXIX, Anaheim Convention Center Anaheim, CA. May 17-22, 1998 Coles, Late-News Paper-7pgs .
Charles Coles, Application Engineer, Micro Linear Corporation "Single Stage CCFL Backlight Resonant Inverter Using PWM Dimming Methods" 4 pgs.
EDN Web Printout-Integrated Circuits: Mar. 1, 1996 4pgs.
File History of Henry, 5,930,121 total 408 pgs.
File History of Henry, 5,923,129 total 117pgs.
File History of Henry Provisional Application total 26 pgs.
File History of Nalbant, 5,615,093 total 183 pgs.
Horowitz & Hill, Art of Electronics second Edition 4 pgs.
LT1070 Design Manual, Application Notes Jun. 19, 1986, Carl Nelson 80pgs.
LT1072 Linear Technology "1.25 High Efficiency Switching Regulator" 16 pgs.
LX1580/LX1581 "Fluorescent Backlight Controller IC" LinFinity Microelectronics Preliminary Specification 18 pgs.
MAXI1739-1839 Maxim Wide Brightness Range CCFL Backlight Controlers 19-1755; Rev 1; 3/01 26 pgs.
ML4878 & Assoc. Docs Oct. 1998 Micro Linear "Single Stage LCD Backlight Lamp Driver" 40 pgs.
ML4878 Feb. 1997 Micro Linear "ML4878 LCD Backlight Lamp Driver" 14 pgs.
ML4878 Oct. 1998 Micro Linear "Single Stage LCD Backlight Lamp Driver" 17 pgs.
ML Application Note 68, May 1998 "ML4878 Single-Stage CCFL Backlight Resonant Inverter" 12 pgs.
ML1010 AN-01, May 1999 "Designing CCFL Inverters with the MP1010" 7 pgs.
ML1010 AN-01, May 1999 "Designing CCFL Inverters with the MP1010" 6 pgs. Version.11.
MP1010 Application Note Jan. 1, 2000 "MP1010 Resonant Mode CCFL Inverter" Monolithic Power Systems Inc. 23 Pgs.
MP1010 Application Note "MP1010 Resonant Mode CCFL Inverter" Monolithic Power Systems Inc. 23 Pgs.
MP1010 Application Note "MP1010 Resonant Mode CCFL Inverter" Monolithic Power Systems Inc. 24 Pgs.
MP1010 Monolithic Power Systems, Inc. "Cold Cathode Fluorescent Lamp Driver" Aug. 2000 Rev 1.3 total 5 pgs.
MP1010 Monolithic Power Systems, Inc. "Cold Cathode Fluorescent Lamp Driver" Preliminary Data Sheet V.2 Feb./99 6pgs.
MP1010 Monolithic Power Systems, Inc. "Cold Cathode Fluorescent Lamp Driver" Version 1.0 Jul./99 5pgs.
MP1010 Monolithic Power Systems, Inc. "Cold Cathode Fluorescent Lamp Driver" Version 1.2 Oct./99 5pgs.
MP1010 Monolithic Power Systems, Inc. "Cold Cathode Fluorescent Lamp Driver" Version 1.1 Sep./99 5pgs.
MP1011, Monolithic Power Systems, Inc. "Cold Cathode Fluorescent Lamp Driver" Preliminary Data Sheet Oct./99 5pgs.
Nalbant, "A New CCFL Inverter Circuit for AMLCD Panels Results in Significantly Higher Efficiency and Brightness" 4 pgs.
Rohn MU010-MPS-ITC004034 13 pgs.
Case No. SACV 04-1174 CJC (ANx) Microsemi Corporation Plaintiff v. Monolithic Power Systems, Inc. Defendant Declaration of Doyle Slack, Filed by Defendant/Counterclaimant Monolithic Power Systems, Inc., in support of its Motion for Summary Judgement of Invalidity of Asserted Claims of U.S. Patent No. 6,198,237 49pgs.
UCC1972/3, UCC2972/3, UCC3972/3 Unitrode "BiCMOS Cold Cathode Fluorescent Lamp Driver Controller" Jan. 2000 17 pgs.
UCC1972/3, UCC2972/3, UCC3972/3 Unitrode "BiCMOS Cold Cathode Fluorescent Lamp Driver Controller" Oct. 1998 revised Nov. 2000 17 pgs.
UCC2975, UCC2976, UCC2977, UCC3975, UCC3976, UCC3977 Texas Instruments "Multi-Topology Piezoelectric Transformer Controller" Jan. 2002 30 pgs.
OZ960A "High-Efficiency Inverter Controller" 9pgs.
Extended EP Search Report received in European Application No. 07004863.2 dated Apr. 25, 2008 (11 pages).
Jim Williams, A Fourth Generation of LCD Backlight Technology, Linear Technology, Nov. 1995, Application Note 65.
Linear Technology, High Efficiency Switching Regulators.
O2 Micro, OZ962, High Effieciency Inverter Controller, pp. 1-10.
Investigation No. 337-TA-666, Certain Cold Cathode Fluorescent Lamp ("CCFL") Inverter Circuits and Products Containing Same, Respondents LG electronics Inc.'s LG Electronics U.S.A. INC's Responses and Objections to Commission Investigate Staff's First Set of Interrogatories to Respondents (Nos. 1-18), 7 Pgs.
Investigation No. 337-TA-666 Certain Cold Cathode Fluorescent Lamp ("CCFL") Inverter Circuits and Products Containing Same, Respondents Asustek Computer Innternational America's Objections and Responses to Compliant O2 micro International LTD's First Set of Interrogatories (Nos. 1-72), 9 Pgs.
Investigation No. 337-TA-666, "Certain Cold Cathode Fluorescent Lamp ("CCFL") Inverter Circuits and Producing Containing Same", Respondents Asustek Computer INC. And Asustek Computer International America's Objections and Responses to Commission Investigate Staff's First Set of Interrogatories (Nos. 1-18), 12 Pgs.
Investigation No. 337-TA-666, "Certain Cold Cathode Fluorescent Lamp ("CCFL") Inverter Circuits and Products Containing Same", Respondents Benq Corp.'s and Benq America, Corp.'s Objections and Responsed to First Set of Interrogatories (1-72) of Complainants O2 Micro International, Ltd. to Respondents, 12 Pgs.
Investigation No. 337-TA-666, "Certain Cold Cathode Flurosecent Lamp ("CCFL") Inverter Circuits and Products Containing Same", Benq Corp and Benq America, Corp.'s Response to Commission Investigate Staff's First Set of Interrogatories to Respondents, 14 Pgs.
Investigation No. 337-TA-666, "Certain Cold Cathode Fluorescent Lamp ("CCFL") Inverter Circuits and Products Containing Same", Response and Objections for Respondent Monolithic Power Systems, Inc. to Complaints O2 Micro International, Ltd. and O2 Micro Inc.'s First set of Interrogatories (Nos. 1-72) To Respondents, 14 Pgs.
Investigation No. 337-TA-666, "Certain Cold Cathode Fluorescent Lamp ("CCfl") Inverter Circuits and Products Containing Same", Response and Objections of Respondent Monolithic Power Systems, Inc. to the Commission Investigative Staff's First Set of Interrogatories to Respondents (Nos. 1-18),13 Pgs.
Investigation No. 337-TA-666, "Certain Cold Cathode Fluorescent Lamp ("CCFL") Inverter Circuits and Products Containing Same", Respondent Microsemi Corporation's Supplemental Responses to O2 Micro's First Set of Interrogatories to All Respondents (Nos. 15,17, 43, 44, 48, 51, 52, 56, 59, 61, and 65), 15 Pgs.

Investigation No. 337-TA-666, "Certain Cold Cathode Fluorescent Lamp ("CCFL") Inverter Circuits and Products Containing Same", Respondent Microsemi Corporation's Responses to O2 Micro's First Set of Interrogatories (Nos. 1-72) to All Resondents, 15 Pgs.

Investigation No. 337-TA-666, "Certain Cold Cathode Fluorescent Lamp ("CCFL") Inverter Circuits and Products Containing Same", Respondent microsemi Corp.'s Responses to Co,mission Investigative Staff's First Set of Interrogatories (Nos. 1-18) to Respondents, 8 Pgs.

* cited by examiner

MIXED-CODE DC/AC INVERTER

FIELD OF THE INVENTION

The present invention relates to a direct current (DC) to alternating current (AC) conversion circuit, and in particular to a DC/AC inverter for liquid crystal display (LCD) backlight.

BACKGROUND OF THE INVENTION

LCD panels are used in various applications ranging from portable electronic devices to fixed location units, such as video cameras, automobile navigation systems, laptop PCs, and industrial machines. The LCD panel itself cannot emit light but must be back lit by a light source. The most commonly used backlight source is a cold-cathode fluorescent lamp (CCFL). However, igniting and running the CCFL requires a high AC signal. Typically, the igniting voltage is approximately 1,000 volts and the running voltage is approximately 500 volts. To generate such a high AC signal from a DC power source, e.g., a rechargeable battery, a DC/AC inverter is designed.

Besides delivering the desired high AC signal, the DC/AC inverter also faces on-going demands for ever-increasing efficiency, higher reliability, size reduction and ever-lower cost. Additionally, the DC/AC inverter is expected to deliver the AC signal with a pure sinusoidal waveform that is desirable to minimize RF emission as well as to provide optimal current-to-light conversion in the CCFL. On the contrary, a distorted sinusoidal waveform with a high crest factor will shorten the lifespan of the CCFL. The crest factor is the ratio of the peak lamp current to the average lamp current.

In terms of the operating frequency, current DC/AC inverters may be divided into two categories, the fixed operating frequency category and the variable operating frequency category. An example of DC/AC inverter with fixed operating frequency is disclosed in U.S. Pat. No. 5,619,402 and herein incorporated by reference in its entirety. This kind of DC/AC inverters has a constant operating frequency regardless of the level of the DC input signal and the load condition. Consequently, though the benefits of high efficiency, reliability, and low electromagnetic interference can be gained when the DC input signal is relatively low or the load is relatively heavy, a higher crest factor of the lamp current will be present when the DC input signal is relatively high or the load is relatively light. As a result, the higher crest factor may shorten the lifespan of the backlight lamp.

A typical example of the DC/AC inverters with variable operating frequency is a "Buck/Royer" circuit 100 as illustrated in FIG. 1. The circuit 100 is essentially a combination of a step-down buck regulator 110 and a self-resonant Royer oscillator 120 with an integral step-up transformer 121. The step-down buck regulator 110 converts an unregulated DC input signal $V_{dc}$ from a battery or a potential line to a stable voltage within a rated input range of the self-resonant Royer oscillator 120. The self-resonant Royer oscillator 120 is composed of the step-up transformer 121, two power switches 123 and 125, a resonant capacitor 127, a base winding 129, a ballast capacitor 131 and a PWM controller 130. The operating frequency of the circuit 100 is set to correspond to a resonant frequency. The resonant frequency is further determined by a resonant circuit consisting of the step-up transformer 121, the resonant capacitor 127, the base winding 129, the ballast capacitor 131 as well as a CCFL load 140. Therefore, the operating frequency will change dynamically with the CCFL load condition and such an operation mechanism is called a variable operating mode.

Some derived topologies of the DC/AC inverters with the variable operating frequency can be found in U.S. Pat. Nos. 5,430,641; 5,619,402; 5,615,093; 5,818,172. Though the AC signal provided by the DC/AC inverters disclosed in these references has a good crest factor, each of them suffers from low conversion efficiency, two-stage power conversions and electromagnetic interference. Additionally, when the load is heavy or under a short circuit condition, a high magnetic flux density will be present at the transformer in the DC/AC inverter. Due to the high magnetic flux density, the transformer may be saturated and the components in the DC/AC inverter may be damaged.

Thus, there are drawbacks associated with both conventional fixed and variable frequency inverters.

SUMMARY OF THE INVENTION

In one embodiment, there is provided a DC/AC inverter for driving a load. The DC/AC inverter includes a DC power supply for supplying a DC input voltage, a converter circuit coupled to the DC power supply which converts the DC input voltage into an AC signal used to drive the load, and a control circuit coupled to the converter circuit which sets a frequency of the AC signal. The control circuit is further capable of operating the DC/AC inverter in a fixed frequency mode and in a variable frequency mode.

In another embodiment, there is provided a method for converting a direct current signal to an alternating current signal for driving a load. The method includes the steps of setting a pre-determined threshold condition, operating in a fixed frequency mode, wherein a frequency corresponding to the alternating current signal is kept at a relatively constant frequency, operating in a variable frequency mode, wherein the frequency corresponding to the alternating current signal is changed in accordance to a resonant frequency corresponding to a resonant circuit, and switching between operating in the fixed frequency mode and the variable frequency mode as a function of the pre-determined threshold condition.

In yet another embodiment, there is provided a system. The system includes a display, a light source coupled to the display for supplying light to emanate from the display, a processing unit coupled to the display for generating data to be displayed on the display, and a controller coupled to the light source which is capable of selecting an optimal operating frequency automatically between a constant frequency mode and a resonant mode.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
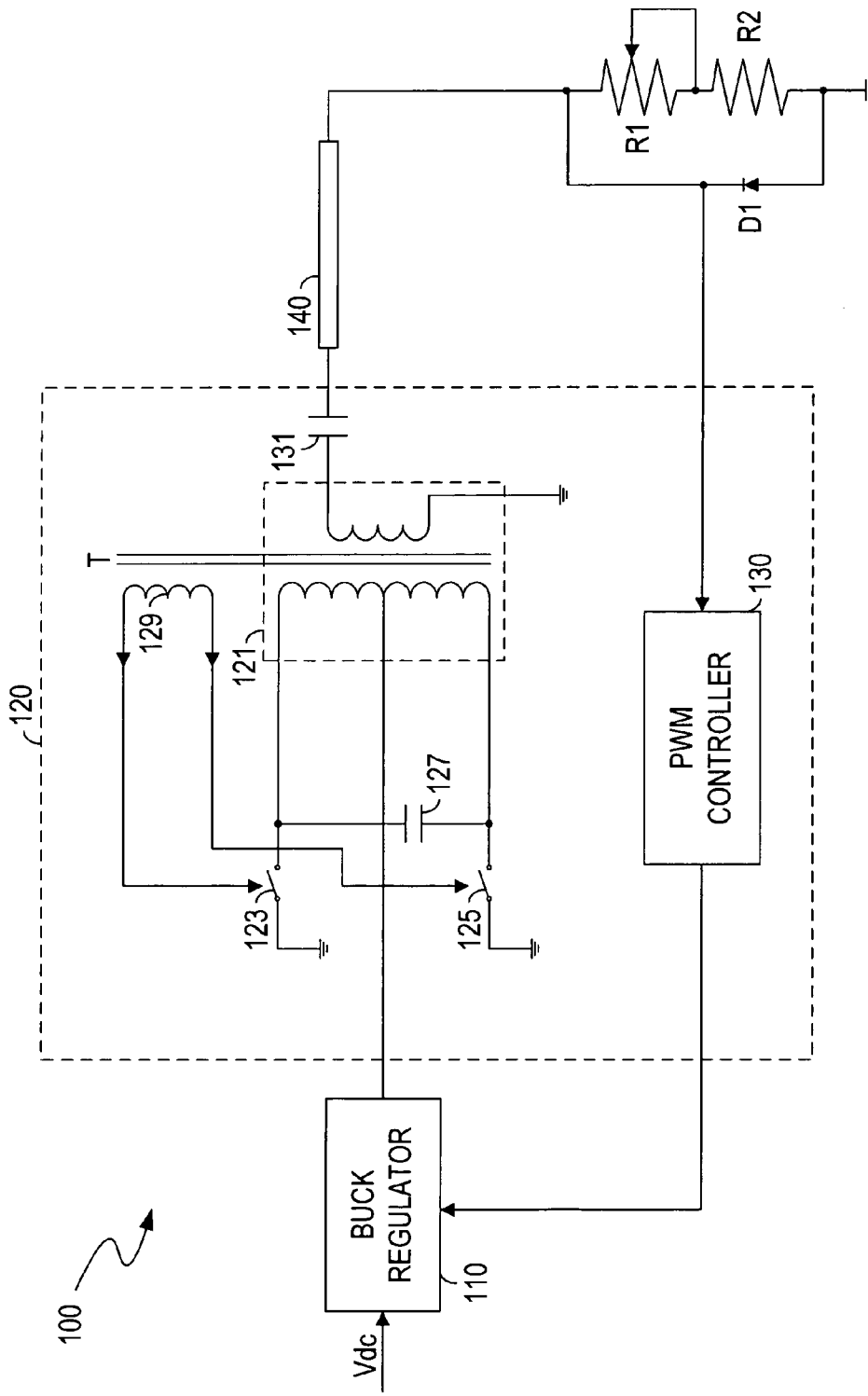
FIG. 1 is a schematic diagram of a prior art "Buck/Royer" circuit.
Figure 2:
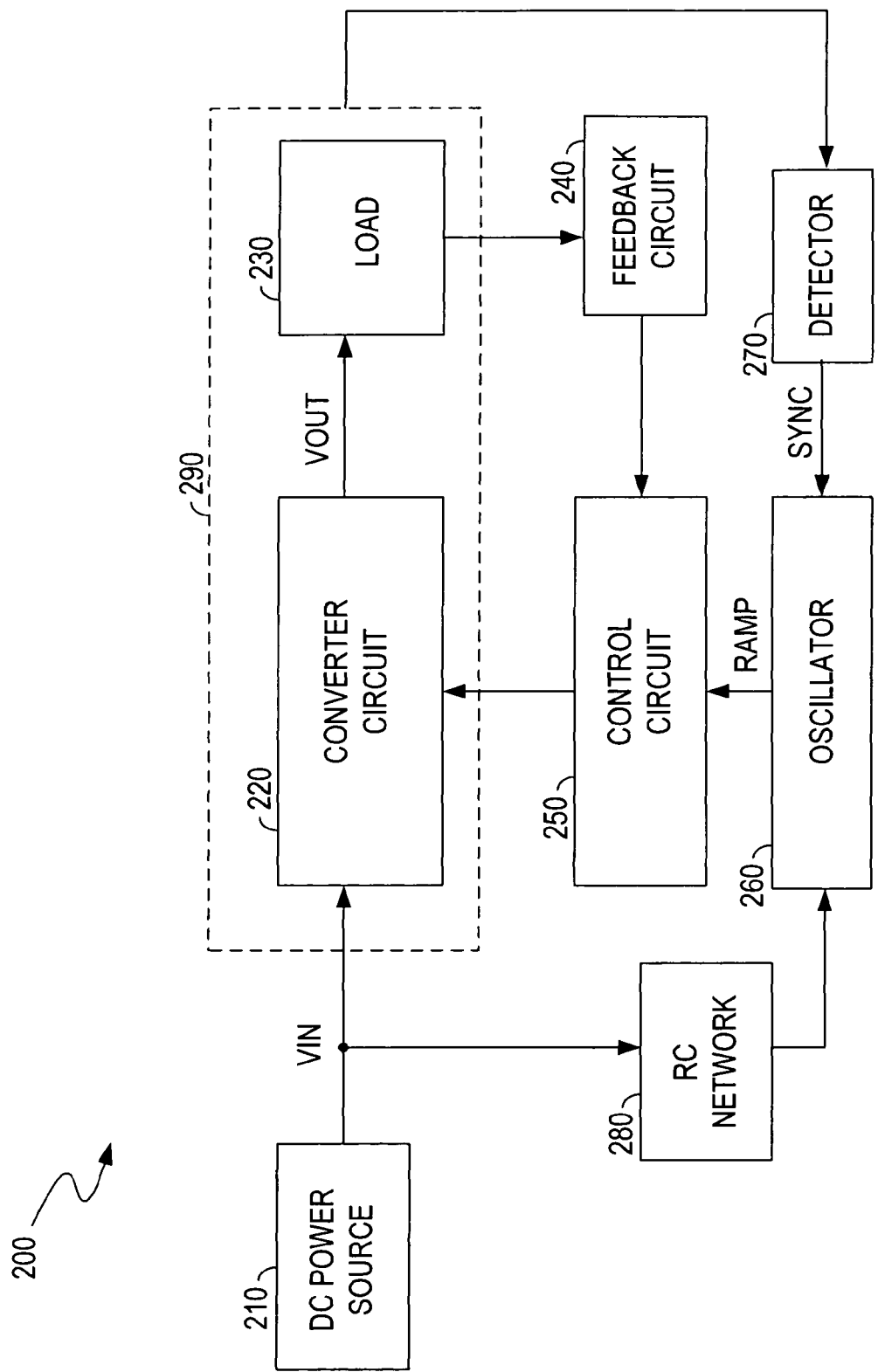
FIG. 2 is a block diagram of a DC/AC inverter according to one embodiment of the present invention.

FIG. 2 illustrates a block diagram of an exemplary DC/AC inverter 200. The DC/AC inverter 200 receives a DC input signal VIN from a DC power source 210 and provides a high AC output signal VOUT to a load 230. The DC power source 210 may be a battery, an adapter, or the like. The load 230 is typically one or more discharge lamps for backlighting the LCD panel, such as the CCFLs. The DC/AC inverter 200 is mainly composed of the converter circuit 220 and the control circuit 250. The converter circuit 220 includes a plurality of switches and a transformer for conducting the DC to AC signal transformation. The control circuit 250 is connected to the converter circuit 220 for providing a dimming control signal. By controlling a conduction state of the plurality of switches in the converter circuit 220, the dimming control signal may adjust a magnitude or frequency of the AC output signal VOUT and thus regulate the brightness of the load 230.

Furthermore, to achieve an AC output signal with optimal magnitude and frequency, the control circuit 250 may operate in either a fixed frequency mode or a variable frequency mode automatically according to a level of the DC input signal VIN and a load condition. When the DC input signal is relatively low or the load is relatively heavy, a ramp signal with a constant frequency may be provided to the control circuit 250 and thus the control circuit 250 will operate in the fixed frequency mode. When the DC input signal is relatively high or the load is relatively light, a ramp signal with a variable frequency may be provided to the control circuit 250 and thus the control circuit 250 will operate in the variable frequency mode. In other words, a threshold may be predetermined according to the DC input voltage and the load condition, and therefore the transition between the fixed frequency mode and the variable frequency mode may be conducted when the threshold is met.

The ramp signal may be provided by an oscillator 260 that is coupled to the control circuit 250. The oscillator 260 is further connected to a detector 270 and a RC network 280 that respectively determine the variable frequency and the constant frequency. The detector 270 detects the resonant frequency of a resonant circuit 290 that is composed of a power train and the load 230, where the power train consists of resonant elements in the converter circuit 220. When the DC input signal VIN is relatively high or the load is relatively light, the detector 270 will produce a signal SYNC with the resonant frequency and send the signal SYNC to the oscillator 260, which in turn generates the ramp signal with the resonant frequency. In that situation, the frequency of the ramp signal is variable and thus the control circuit 250 operates in the variable frequency mode. As a result, the frequency of the AC output signal is changed in accordance with the resonant frequency. When the DC input signal is relatively low or the load is relatively heavy, the signal SYNC produced by the detector 270 will have a constant level, which indicates that the control circuit 250 will operate in the fixed frequency mode. In that situation, the frequency of the ramp signal is constant and determined by the RC network 280 and thus the control circuit 250 operates in the fixed frequency mode. As a result, the frequency of the AC output signal is set to the constant frequency as determined by the RC network 280.

Additionally, the DC/AC inverter 200 uses a closed-loop scheme in order to have tight control over the brightness of the load 230. To realize the closed-loop scheme, a feedback circuit 240 is coupled between the control circuit 250 and the load 230 for sensing the current flowing through the load 230. Moreover, the feedback circuit 240 may also include a voltage feedback for circuit protection.

Figure 3:
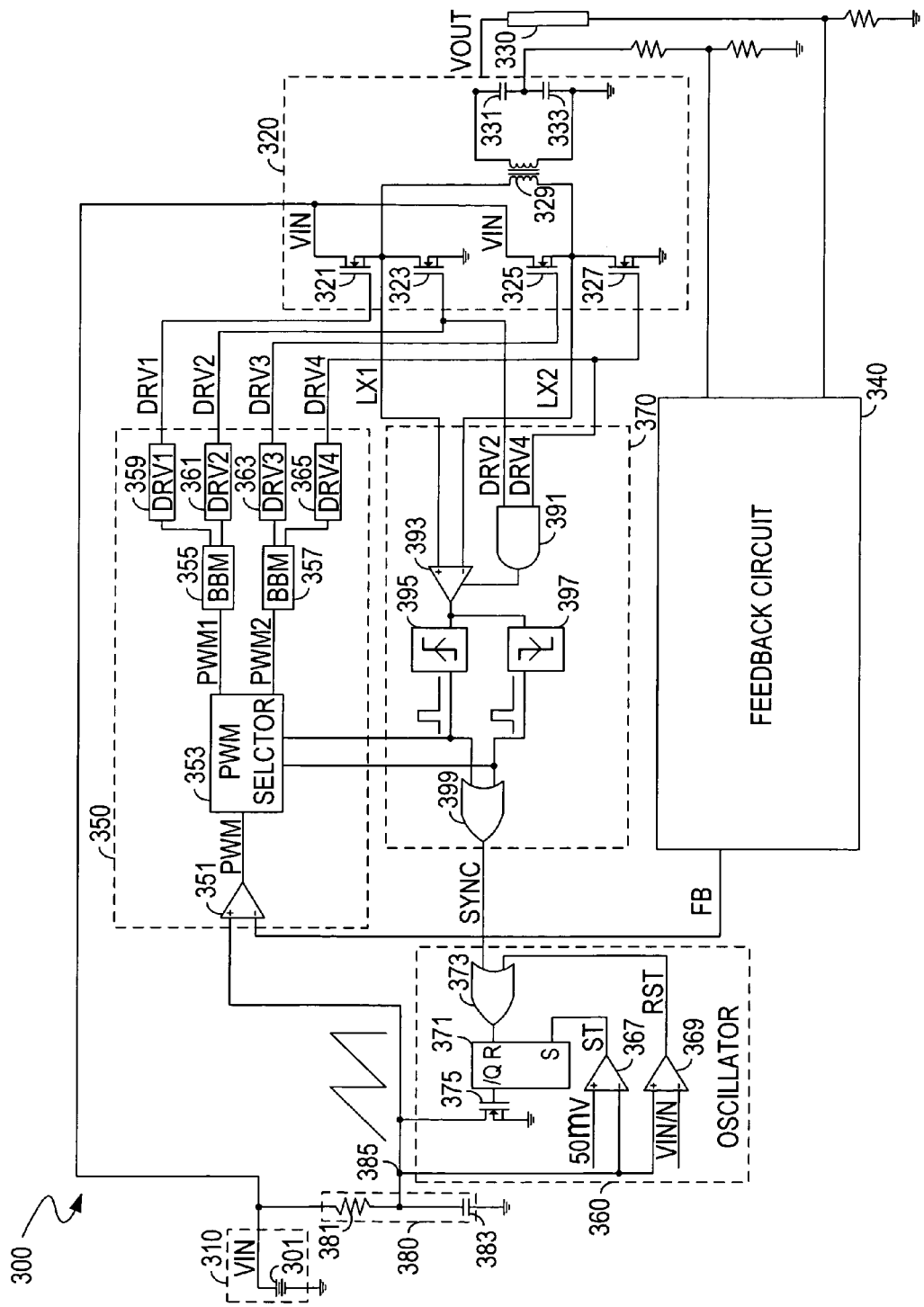
FIG. 3 is a schematic diagram of a DC/AC inverter according to one embodiment of the present invention.

FIG. 3 illustrates an exemplary schematic diagram 300 of a DC/AC inverter. Referring to FIG. 3, the circuit 300 consists of a DC power source 310, a converter circuit 320, a load 330, a feedback circuit 340, a control circuit 350, an oscillator 360, a detector 370 and a RC network 380. The DC power source 310 for providing the DC input signal VIN is composed of a battery 301. The converter circuit 320 is composed of a plurality of switches 321, 323, 325 and 327, a transformer 329 and capacitors 331 and 333. The plurality of switches may be constructed of metal-oxide-semiconductor field effect transistors (MOSFETs) and arranged as diagonal pairs of switches. As shown in FIG. 3, the switches 321 and 323 are connected in series between the DC input signal VIN and the ground, and a junction node of both switches is connected to one terminal of the transformer 329. The switches 325 and 327 are connected in series between the DC input signal VIN and the ground, and a junction node of both switches is connected to the other terminal of the transformer 329. The diagonal pairs of switches define alternating conduction paths between the DC input signal VIN and the transformer 329. By going through the alternating conduction paths, the DC input signal VIN is converted to an intermediate AC signal. The intermediate AC signal is then boosted to the high AC output signal VOUT by the transformer 329.

As previously stated, by controlling a conduction state of the plurality of switches, the control circuit 350 may adjust the magnitude or frequency of the AC output signal VOUT. The conduction state of the plurality of switches is herein controlled by drive signals DRV1 to DRV4 from the control circuit 350. The control circuit 350 is further connected to the oscillator 360 for receiving the ramp signal and connected to the feedback circuit 340 for receiving a feedback signal (FB). Based on the ramp signal and the feedback signal, the control circuit 350 generates the drive signals.

Referring to FIG. 3, the control circuit 350 may consist of a comparator 351, a pulse width modulated (PWM) selector 353, break before make (BBM) circuits 355 and 357, and drive circuits 359, 361, 363 and 365. The comparator 351 generates a PMW signal by comparing the ramp signal to the feedback signal. By defining different action edges, for example a falling edge and a rising edge respectively, the PWM selector 353 derives two PWM signals PWM1 and PWM2 from the PWM signal. The PWM signals PWM1 and PWM2 are then sent to the BBM circuits 355 and 357 respectively. In each BBM circuit, the inputted PWM signal is further converted to two complementary signals. Each complementary signal is further transformed into a drive signal by one of the drive circuits 359, 361, 363 and 365. As shown in FIG. 3, the drive circuit 359 generates the drive signal DRV1 and sends it to the switch 321, the drive circuit 361 generates the drive signal DRV2 and sends it to the switch 323, the drive circuit 363 generates the drive signal DRV3 and sends it to the switch 325, and the drive circuit 367 generates the drive signal DRV4 and sends it to the switch 327. Due to the BBM circuit 355, the switches 321 and 323 are ensured not to be turned on concurrently. Similarly, due to the BBM circuit 357, the switches 325 and 327 are ensured not to be turned on concurrently. Furthermore, by controlling the ramp signal provided to the control circuit 350, the control circuit 350 can operate in either the fixed frequency mode or the variable frequency mode. As a result, the DC/AC inverter is ensured to deliver a sinusoidal waveform with optimal magnitude and frequency to the load 330.

The ramp signal is controlled by a combination of the oscillator 360, the RC network 380 and the detector 370. The RC network 380 is composed of a resistor 381 and a capacitor 383 which are connected in series between the DC input signal VIN and the ground.

The detector 370 is composed of an AND gate 391, a comparator 393, a first edge-triggered flip-flop 395, a second edge-triggered flip-flop 397 and an OR gate 399. The non-inverting terminal of the comparator 393 is connected to the junction node of the switches 321 and 323 through line LX1, and the inverting terminal of the comparator 393 is connected to the junction node of the switches 325 and 327 through line LX2. The output terminal of the comparator 393 is connected to both edge-triggered flip-flops 395 and 397. The outputs of the edge-triggered flip-flops 395 and 397 are fed to the inputs of the OR gate 399. Finally, the OR gate 399 outputs the signal SYNC. In operation, by detecting the zero crossing current of the diagonal pairs of switches, the detector 370 tries to track the resonant frequency that is determined by the resonant elements in the converter circuit 320 and the load 330. The current of the diagonal pairs of switches is indicated by the voltages on lines LX1 and LX2. If the zero crossing current is detected, the resonant frequency is tracked and thus the signal SYNC will show a square waveform at the resonant frequency, which also means the variable frequency mode is selected. Otherwise, no resonant frequency is tracked and thus the signal SYNC will have a constant level, which also means the fixed frequency mode is selected.

Additionally, the comparator 393 detects the zero crossing current only when both switches 323 and 327 are turned on, so that the AND gate 391 conducts an AND operation of drive signals DRV2 and DRV4 and then produces an enable signal for the comparator 393. Based on the enable signal, it is ensured that the zero crossing current is detected when both switches 323 and 327 are turned on. Furthermore, the edge-triggered flip-flops 395 and 397 are connected to the PWM selector 353 to define the action edge as stated previously.

The oscillator 360 is connected to the resistor 381 and the capacitor 383 in the RC network 380 at a junction node 385, where the ramp signal is generated. The oscillator 360 is further connected to the output terminal of the OR gate 399 in the detector 370 for receiving the signal SYNC. As shown in FIG. 3, the oscillator 360 may be composed of a first comparator 367, a second comparator 379, a flip-flop 371, an OR gate 373 and a discharge switch 375. The first comparator 367 and the second comparator 369 form a voltage comparator. The non-inverting terminal of the first comparator 367 receives a low threshold voltage, for example 50 mv. The inverting terminal of the second comparator 369 receives a high threshold voltage, VIN/N, where the term N herein may be an integer. The inverting terminal of the first comparator 367 and the non-inverting terminal of the second comparator 369 are connected to the junction node 385 for receiving the ramp signal. Depending on a comparison result between the ramp signal and the high and low threshold voltages, a set signal (ST) is delivered from the output terminal of the first comparator 367 to the set terminal (S) of the flip-flop 371, and a reset signal (RST) is delivered from the output terminal of the second comparator 369 to the OR gate 373. Meanwhile, the OR gate 373 receives the signal SYNC from the detector 370. The output terminal of the OR gate 373 is connected to reset terminal (R) of the flip-flop 371. The output of the flip-flop 371 is used to control a conduction state of the switch 375. The switch 375 is connected between the junction node 385 and the ground.

According to the DC input voltage VIN and the load condition, the ramp signal generated at the junction node 385 has either a constant frequency or a variable frequency. The constant frequency is determined by the resistance of the resistor 381 and the capacitance of the capacitor 383 in the RC network 380. The variable frequency is equal to the resonant frequency tracked by the detector 370. Depending on the ramp signal, the control circuit 350 will operate in either the fixed frequency mode or the variable frequency mode.

Additionally, those skilled in the art will realize that the feedback circuit 340 may be constructed of any commonly used circuitries for sensing the current flowing through the load 330. Considering the feedback function is not significantly relevant to the present invention, a detailed description of the feedback circuit 340 is omitted herein for simplicity. Those skilled in the art will also realize that besides the topology as illustrated herein, the converter circuit 320 may be configured in other well known topologies, such as half-bridge topology and push-pull topology, and the control circuit 350 will adopt corresponding configurations to drive the switches in the converter circuit 320. For various configurations, the control circuit 350 may operate in either the fixed frequency mode or the variable frequency mode automatically according to the present invention.

Figure 4:
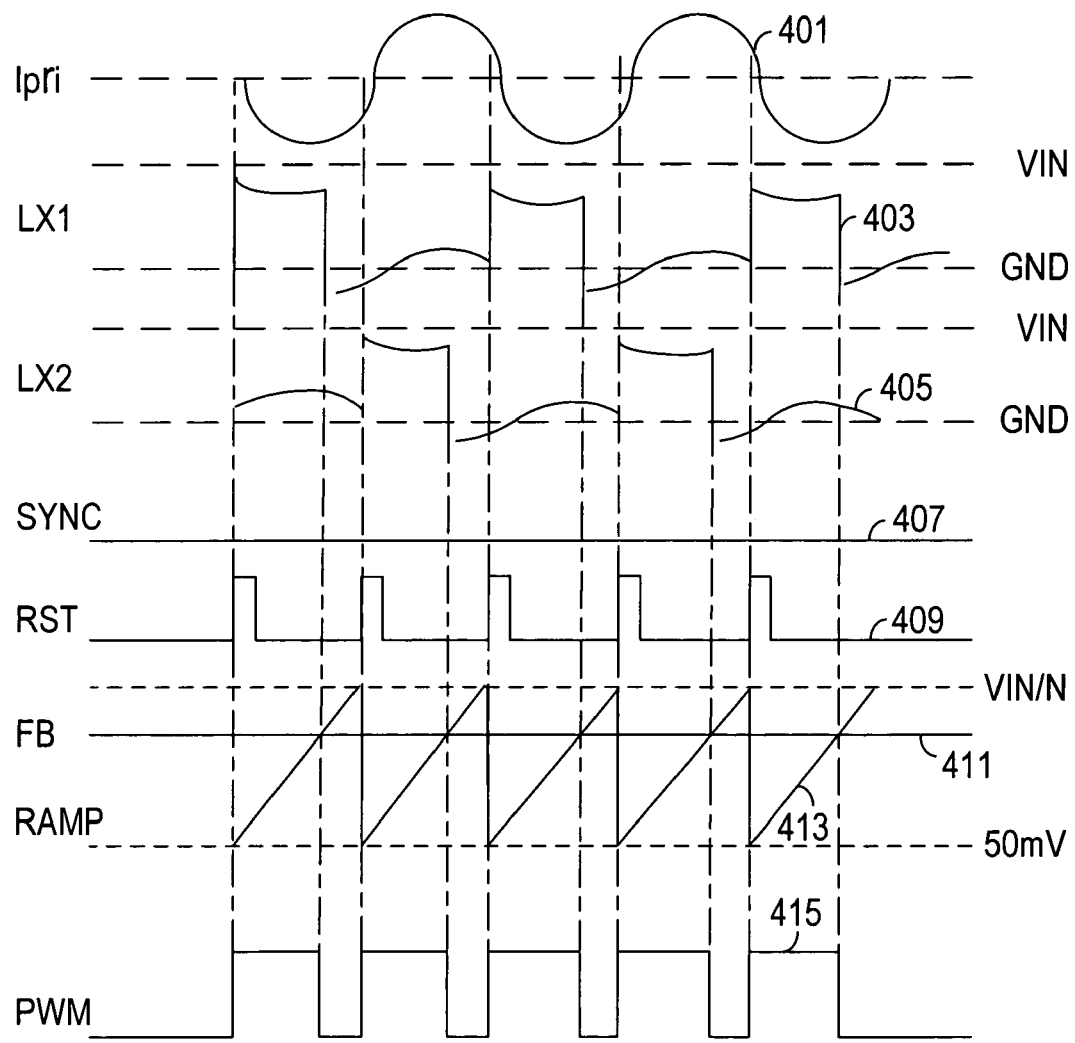
FIG. 4 is a diagram depicting various waveforms that occur when the DC/AC inverter in FIG. 3 is operating in a fixed frequency mode.
Figure 5:
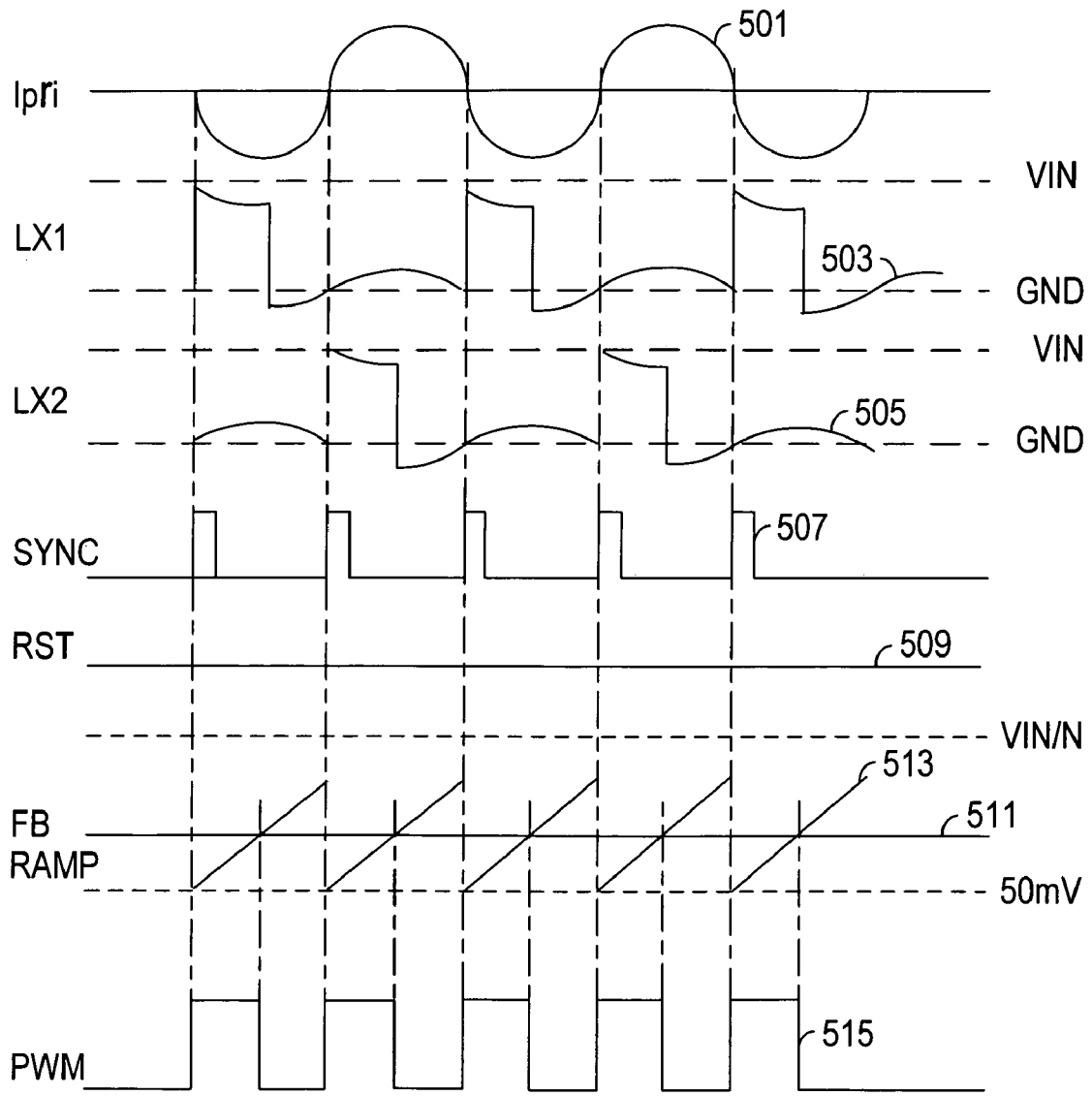
FIG. 5 is a diagram depicting various waveforms that occur when the DC/AC inverter in FIG. 3 is operating in a variable frequency mode.

Referring to FIGS. 4 and 5, operation of the DC/AC inverter in FIG. 3 will be depicted in detail. Assuming a threshold that takes into account the DC input signal VIN and the load condition is predetermined, the threshold is not met and the control circuit 350 will operate in the fixed frequency mode when the DC input signal VIN does not exceed a predetermined voltage level or the load amount is higher than a predetermined value. FIG. 4 illustrates a diagram depicting various waveforms that occur in the fixed frequency mode.

Referring to FIG. 4, it can be observed that the operating frequency of the control circuit 350, or the frequency of the PWM signal represented by a waveform 415, is determined by a charging and discharging period of the ramp signal represented by a waveform 413. When the ramp signal falls to the low threshold voltage, e.g., 50 mV, the set signal ST is triggered and thus the discharge switch 375 is turned off. The discharging period of the ramp signal terminates and the charging period of the ramp signal begins. When the ramp signal rises to the high threshold voltage, VIN/N, the reset signal RST represented by a waveform 407 is triggered and thus the discharge switch 375 is turned on. The charging period of the ramp signal terminates and the discharging period of the ramp signal begins. Those skilled in the art will realize that the charging and discharging speed is determined by the resistor 381 and the capacitor 383 in the RC network 380. Therefore, the operating frequency as well as the charging and discharging period of the ramp signal is determined by the predetermined high and low threshold voltages, the resistance of the resistor 381 and the capacitance of the capacitor 383.

Dominated by the constant frequency, the diagonal pairs of switches will not have the zero crossing current simultaneously, which is illustrated by the waveforms 403 and 405. The waveforms 403 and 405 respectively depict the voltages on lines LX1 and LX2. These voltages may indicate the current flow of the diagonal pairs of switches and thus zero voltage crossing on waveforms 403 and 405 indicates zero current crossing of the diagonal pairs of switches. Observed from the waveforms 403 and 405, zero crossing current does not occur concurrently on the diagonal pairs of switches.

Without the simultaneous zero crossing current, the signal SYNC will have a constant level as represented by a waveform 407. Additionally, a waveform 401 indicates a current Ipri flowing through the primary winding of the transformer 329 in FIG. 3. A waveform 411 represents the feedback signal (FB) provided by the feedback circuit 340. The feedback signal crosses the ramp signal and determines the duty cycle of the PWM signal.

The control circuit 350 will stay in the fixed frequency mode until the threshold is met. In other words, when the DC input signal VIN exceeds the predetermined voltage level or the load amount is lower than the predetermined value, the resonant frequency will be tracked by detecting the simultaneous zero crossing voltages on lines LX1 and LX2. FIG. 5 illustrates a diagram depicting various waveforms that occur in the variable frequency mode.

Referring to FIG. 5, it can be observed that the operating frequency of the control circuit 350, or the frequency of the PWM signal represented by a waveform 515, is still determined by a charging and discharging period of the ramp signal represented by a waveform 513. Different from the waveform 413 in FIG. 4, the ramp signal cannot be charged to the preset high threshold voltage VIN/N, and therefore the operating frequency is no longer determined by the predetermined high and low threshold voltages, the resistance of the resistor 381 and the capacitance of the capacitor 383.

Actually, the operating frequency as well as the charging and discharging period of the ramp signal are determined by the frequency of the signal SYNC represented by a waveform 507. The frequency of the signal SYNC further reflects the resonant frequency and is acquired by detecting zero crossing voltage of the lines LX1 and LX2. As illustrated by waveforms 503 and 505, when both voltages on lines LX1 and LX2 cross zero simultaneously, a pulse will be triggered on the waveform 507. Referring to FIG. 3, the pulse will reset the flip-flop 371 which in turn switches on the discharge switch 375. Therefore, the charging period of the ramp signal terminates immediately and the discharging period begins before the preset high threshold voltage VIN/N is reached. Consequently, the operating frequency is determined by the resonant frequency in the variable frequency mode. Since the high threshold voltage VIN/N is not reached, the reset signal RST maintains a constant level as illustrated by a waveform 509. Additionally, a waveform 501 shows a current Ipri flowing through the primary winding of the transformer 329 in FIG. 3. A waveform 511 represents the feedback signal (FB) provided by the feedback circuit 340. The FB signal crosses the ramp signal and determines the duty cycle of the PWM signal.

In operation, the DC/AC inverter may be applied to a display system. For example, the display system may further include a display panel, a light source placed behind the display panel for providing backlight, and a processing circuit connected to the display panel for generating data, based on which, a picture will be displayed on the display panel. The DC/AC inverter may act as a controller for igniting and running the light source. The DC/AC inverter is connected to the light source for transforming a DC input signal from an external DC power supply into an AC output signal and then providing the AC output signal to the light source. Driven by the AC output signal, the light source is ignited and emits light that emanates from the display panel. The DC/AC inverter may operate in either a fixed frequency mode or a variable frequency mode according to the DC input signal and the light source to achieve a high efficiency and good crest factor of the AC output signal. The good crest factor is preferred to extend the life of the light source.

When the DC input signal does not exceed a predetermined voltage level or lamps used as the light source exceed a predetermined number, a good crest factor is guaranteed and the DC/AC inverter will operate in the fixed frequency mode to achieve a high efficiency. When the DC input signal exceeds the predetermined voltage level or the lamps used as the light source exceed the predetermined number, the DC/AC inverter will operate in the variable frequency mode to ensure the AC output signal has a good crest factor.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A DC-to-AC inverter for driving a load, comprising:
   a DC power supply for supplying a DC input voltage;
   a converter circuit coupled to the DC power supply which converts the DC input voltage into an AC signal used to drive the load;
   a control circuit coupled to the converter circuit which sets a frequency of the AC signal, wherein the control circuit is capable of operating the DC-to-AC inverter in a constant frequency mode and in a variable frequency mode; and
   a resonant circuit coupled to the control circuit having a resonant frequency, wherein when the control circuit operates the DC-to-AC inverter in the variable frequency mode, the frequency of the AC signal is synchronized with the resonant frequency.

2. The DC-to-AC inverter of claim 1 further comprising:
   a resistor coupled to the control circuit;
   a capacitor coupled to the control circuit;
   an oscillator coupled to the control circuit, wherein the oscillator sets the frequency of the AC signal to a relatively constant frequency when operating in the constant frequency mode according to a resistance of the resistor and a capacitance of the capacitor.

3. The DC-to-AC inverter of claim 1, wherein the resonant circuit comprises a power train having a transformer and also comprises a load.

4. The DC-to-AC inverter of claim 1, wherein the control circuit operating the DC-to-AC converter in the constant frequency mode improves overall efficiency and the control circuit operating the DC-to-AC converter in the variable frequency mode improves overall waveform crest factor.

5. The DC-to-AC inverter of claim 1, wherein the control circuit operates in either the constant frequency mode or the variable frequency mode as a function of the input DC voltage and a condition of the load.

6. The DC-to-AC inverter of claim 1, wherein the load comprises a light source used to backlight an LCD display.

7. The DC-to-AC inverter of claim 1 further comprising:
   a detector coupled to the control circuit and the resonant circuit and operable for detecting the resonant frequency and for generating a signal capable of indicating a mode selected from the constant frequency mode and the variable frequency mode, wherein a frequency of the signal is synchronized with the resonant frequency in the variable frequency mode and wherein the signal has a constant level in the constant frequency mode.

8. The DC-to-AC inverter of claim 1 further comprising:
a detector coupled to the control circuit which determines when a pre-determined threshold has been met, wherein when the threshold is met, the control circuit changes from operating in the constant frequency mode to operating in the variable frequency mode.

9. The DC-to-AC inverter of claim 8, wherein the pre-determined threshold comprises a particular voltage and when the input voltage exceeds the particular voltage, the control circuit operates the DC-to-AC inverter in the variable frequency mode and when the input voltage does not exceed the particular voltage, the control circuit operates the DC-to-AC inverter in the constant frequency mode.

10. The DC-to-AC inverter of claim 8, wherein the pre-determined threshold comprises a load condition and when the load condition is met, the control circuit operates the DC-to-AC inverter in the constant frequency mode and when the load condition is not met, the control circuit operates the DC-to-AC inverter in the variable frequency mode.

11. A system comprising:
a display;
a light source coupled to the display for supplying light to emanate from the display;
a processing unit coupled to the display for generating data to be displayed on the display; and
a controller coupled to the light source which is capable of selecting an optimal operating frequency automatically between a constant frequency mode and a resonant mode, wherein when the controller operates in the resonant mode, a frequency of an AC signal is synchronized with a resonant frequency of resonant circuit elements within the system.

12. The system of claim 11, wherein the controller selects the constant frequency mode when an input voltage is below a pre-determined value and the controller selects the constant frequency mode when a load condition is exceeded.

13. The system of claim 11, wherein the controller selects the resonant mode when an input voltage exceeds a pre-determined value and the controller selects the resonant mode when a load condition is exceeded.

14. A method for converting a direct current signal to an alternating current signal for driving a load comprising:
setting a pre-determined threshold condition;
operating in a fixed frequency mode, wherein a frequency corresponding to the alternating current signal is kept at a relatively constant frequency;
operating in a variable frequency mode, wherein the frequency corresponding to the alternating current signal is synchronized with a resonant frequency corresponding to a resonant circuit; and
switching between operating in the fixed frequency mode and the variable frequency mode as a function of the pre-determined threshold condition.

15. The method of claim 14 further comprising:
setting the frequency of the alternating current signal to the relatively constant frequency as determined by a resistor and capacitor when operating in the fixed frequency mode.

16. The method of claim 14 further comprising:
changing frequencies of the alternating current signal to track the resonant frequency of the resonant circuit when operating in the variable frequency operation.

17. The method of claim 14, wherein the pre-determined threshold condition includes an input DC voltage.

18. The method of claim 14 wherein the pre-determined threshold condition includes a load condition.

19. The method of claim 14 further comprising:
operating in the fixed frequency mode for enhanced efficiency and reliability; and
operating in the variable frequency mode for enhanced waveform crest factor.

20. The method of claim 14, wherein the load comprises a light source.

21. The method of claim 14 further comprising:
detecting the resonant frequency; and
generating a signal capable of indicating a mode selected from the constant frequency mode and the variable frequency mode, wherein a frequency of the signal is synchronized with the resonant frequency in the variable frequency mode and wherein the signal has a constant level in the constant frequency mode.

* * * * *